(12) United States Patent
Kurose (10) Patent No.: US 7,719,938 B2
(45) Date of Patent: May 18, 2010

(54) OPTICAL DISK RECORDING/REPRODUCING APPARATUS AND OPTICAL DISK RECORDING METHOD

(75) Inventor: Takeshi Kurose, Ehime (JP)

(73) Assignee: Panasonic Corporation, Osaka (JP)

( * ) Notice: Subject to any disclaimer, the term of this patent is extended or adjusted under 35 U.S.C. 154(b) by 803 days.

(21) Appl. No.: 11/578,701

(22) PCT Filed: May 19, 2005

(86) PCT No.: PCT/JP2005/009192
§ 371 (c)(1),
(2), (4) Date: Oct. 17, 2006

(87) PCT Pub. No.: WO2005/114660
PCT Pub. Date: Dec. 1, 2005

(65) Prior Publication Data
US 2007/0253298 A1    Nov. 1, 2007

(30) Foreign Application Priority Data
May 20, 2004    (JP)    ............... 2004-149837

(51) Int. Cl.
*G11B 7/0045* (2006.01)
(52) U.S. Cl. .................. 369/47.53; 369/53.31
(58) Field of Classification Search ... 369/47.49–47.53, 369/53.25–53.27
See application file for complete search history.

(56) References Cited
U.S. PATENT DOCUMENTS
6,134,209 A * 10/2000 Den Boef ................ 369/47.53

2001/0043528 A1* 11/2001 Sekiya et al. ............ 369/47.53
2004/0066722 A1*  4/2004 Masuda et al. ........... 369/47.44
2005/0249074 A1* 11/2005 Yanagawa ................ 369/47.53

FOREIGN PATENT DOCUMENTS
| JP | 09-180193 | 7/1997 |
| JP | 2002-230815 | 8/2002 |
| JP | 2002-319135 | 10/2002 |

* cited by examiner

*Primary Examiner*—William J Klimowicz
*Assistant Examiner*—Nathan Danielsen
(74) *Attorney, Agent, or Firm*—Dickinson Wright PLLC (57) ABSTRACT

An optical disk recording/reproducing apparatus for accurately determining optimum recording power of a laser beam even if medium deviations occurs, stabilizing recording quality, and realizing recording which hardly causes read inability error. In test recording, a laser drive (5) irradiates a laser beam to an optical disk (1) to record information while varying the recording power stepwise and reproduce the information stepwise recorded on the optical disk. A recorded state index value calculating unit (9) determines the value representing the index of the recorded state from the signal level of the reproduced information at each step. A smoothing calculating unit (11) performs smoothing calculation of the recorded state index value at each step. An optimum recording power determining unit (12) determines the optimum power by acquiring the optimum value from the recorded state index values at the steps after smoothing calculation to record information on the optical disk with the optimum power determined in recording.

8 Claims, 9 Drawing Sheets

DATA[1~N]  :-8.14 -7.29 -5.97 -1.06 3.67 3.89 7.53 11.58 10.98 13.04 16.49 16.74 18.53 21.84 22.78
DATA2[1~N] :-8.14 -7.13 -4.77 -1.12 2.17 5.03 7.67 10.03 11.87 13.59 15.42 17.52 18.95 21.05 22.78

PRIOR ART

OPTICAL DISK RECORDING/REPRODUCING APPARATUS AND OPTICAL DISK RECORDING METHOD

TECHNICAL FIELD

The present invention relates to an optical disk recording/reproducing apparatus, and particularly to a process (OPC: Optimum Power Control) of acquiring the optimum recording power of a laser beam irradiated in performing a recording operation on a disk.

BACKGROUND ART

Figure 6:
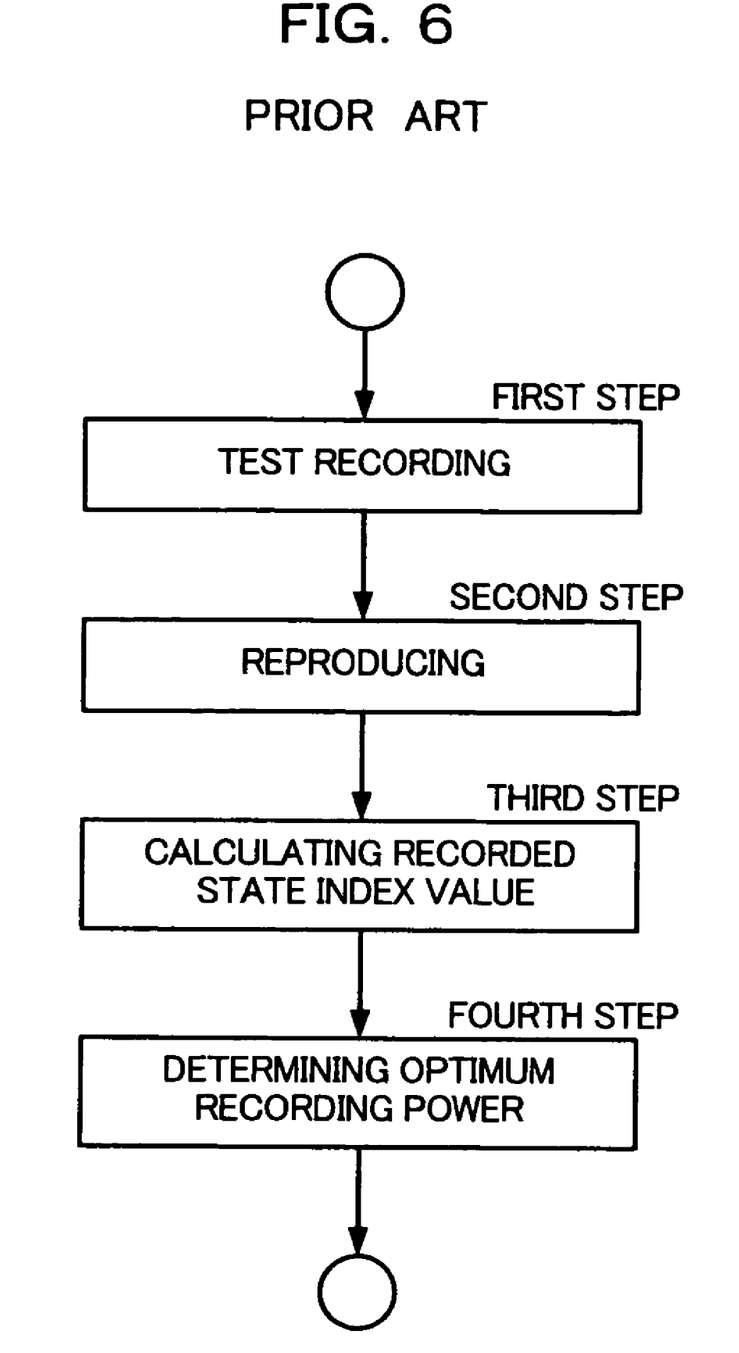
FIG. 6 is a flow chart showing an OPC operation by a known optical disk recording/reproducing apparatus.

FIG. 6 shows a procedure of a general OPC of a disk recording/reproducing apparatus which irradiates an optical laser beam from an optical head and varies a reflectance of a recording layer of a disk to perform a recording operation. As shown in FIG. 6, first, while a recording power of the optical laser beam is varied on a test recording area of the disk stepwise, for example, by fifteen steps, a test recording operation (test writing of data) is performed (first step). Next, an RF signal is reproduced and sampled while the test recording area (an area to which the test writing operation is performed) is read again (second step), a recording state index value (for example, β (asymmetry)) which represents an index of a recording state is calculated from the sampled RF signal (third step), and a value closest to a target value is selected out of the calculated recording state index values and a power corresponding thereto is selected as an optimum recording power, thereby determining the optimum power of the laser beam irradiated in recording operation (fourth step).

However, recently, recording media become diversified with increase in writing speed, decrease in price and the like, and there are deviations in media quality and characteristic of apparatuses. Accordingly, even if a power is varied stepwise at the time of performing the general OPC, the recording state index value which can be obtained is not always changed uniformly. In this case, the optimum recording power may be not accurately acquired or an improper recording power may be acquired. When a recording operation is performed with an inaccurate optimum recording power, there occurs a problem that a recording quality is deteriorated, thereby not reading the recorded data.

As a known method solving such a problem, there is disclosed a method in which the test recording area is reproduced, the recording state index value is acquired, powers P1 and P2 of a point on which the acquired recording state index value is varied from large to small and a point on which the acquired recording state index value is varied again from small to large are acquired, and an average of the powers P1 and P2 is given as the optimum recording power (for example, see (Paragraphs 7 to 14 and FIG. 2) of Patent Document 1 (JP-A-9-180193)).

As another known method, there is disclosed a method in which an unrecorded area is reproduced prior to a recording operation, a scratch or a fingerprint of the disk is detected, and a corresponding point is skipped in OPC when the scratch or the fingerprint is detected (Paragraphs 5 to 7 and FIG. 9) of (for example, see Patent Document 2 (JP-A-2002-319135).

DISCLOSURE OF THE INVENTION

Problem to be Solved by the Invention

Figure 7:
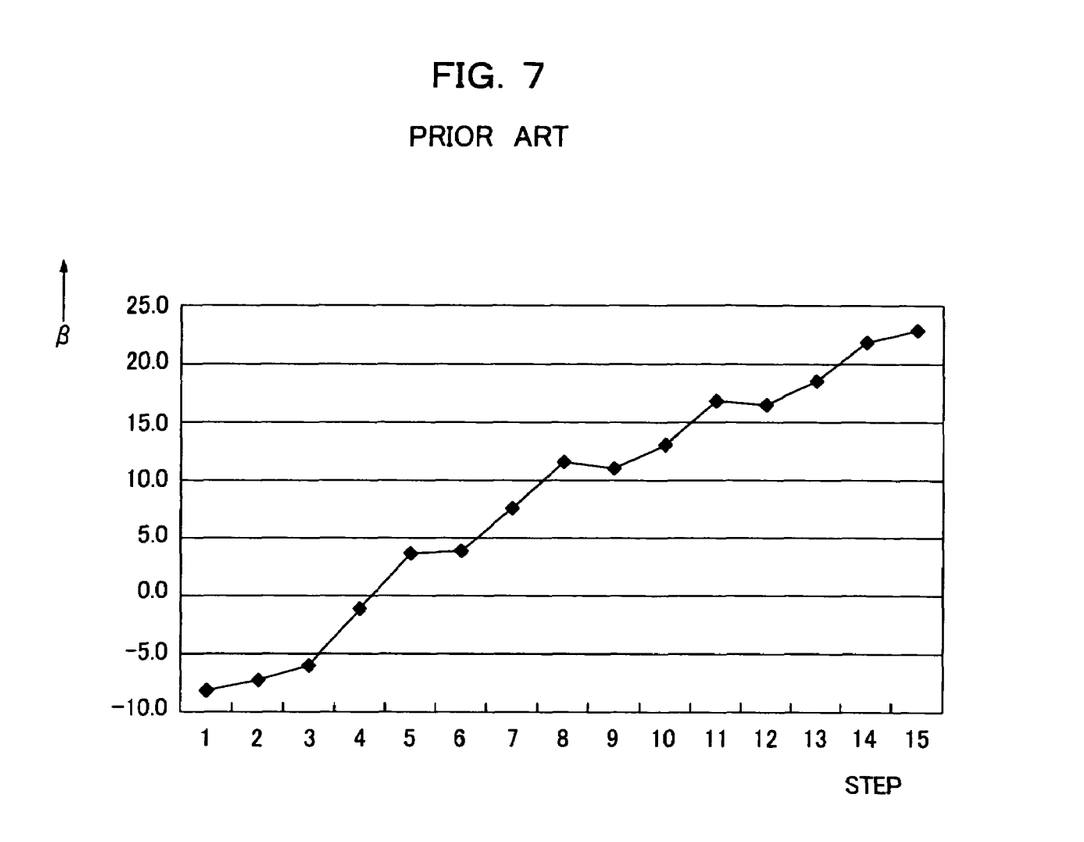
FIG. 7 is a characteristics graph of $\beta$ acquired by a known optical disk recording/reproducing apparatus.

However, as described above, deviations of media, the deviations of the apparatuses and the like is considered as factors which do not always change a recording state index value uniformly, but there are also considered, particularly, an eccentricity and a face blurring of the media, a blurring of a motor shaft of an apparatus and a deviation of a checking portion of the apparatus in addition to a scratch of the media or a fingerprint. In case of such factors, for example, a swell is generated in the recording state index value as shown in FIG. 7 in synchronization with rotation of the media. In FIG. 7, steps are represented in abscissa and β (asymmetry) is represented in ordinate.

In addition, when the eccentricity or the face blurring occurs in the media, the swell synchronized with rotation of the disk as shown in FIG. 7 is generated even in actual data recording as well as in test writing. When the swell is large, a recording state becomes unstable even if recording is performed with an optimum recording power, thereby causing a read error in reproduction.

In order to solve these problems, when the invention of Patent Document 1 is used, points in which the recording state index value is varied from large to small and from small to large may not always be shown in vicinity of a location corresponding to the optimum recording power and the optimum recording power is not accurately acquired.

In addition, in the invention of Patent Document 2, since there is a step that reproducing is performed in a unrecorded state prior to OPC and a signal state is confirmed, processing time gets longer.

An object of the present invention is to provide an optical disk recording/reproducing apparatus and an optical disk recording method which can stabilize a recording quality and realize recording in which a read inability error does not easily occur since the optimum recording power can be accurately acquired even if the deviations, the blurring of the motor shaft or the deviation of the disk checking portion occur.

Means for Solving the Problem

In order to the above-mentioned object, provided by the present invention is an optical disk recording/reproducing apparatus for recording and reproducing information by irradiating a laser beam to an optical disk on which data are recorded, and performing a test recording operation on the optical disk to determine optimum recording power of the laser beam prior to recording information, the optical disk recording/reproducing apparatus comprising: an information recording unit for recording information by irradiating the laser beam to the optical disk while varying the recording power stepwise; an information reproducing unit for reproducing the information stepwise recorded in the optical disk by the information recording unit; a recorded state index value calculating unit for calculating recorded state index values which represent an index of a recorded state from signal levels of the information reproduced by the information reproducing unit; a smoothing calculating unit for performing a smoothing operation to the recorded state index values calculated stepwise by the recorded state index value calculating unit; and an optimum power determining unit for determining the optimum power by finding out the optimum value from the recorded state index values after the smoothing calculating unit performs the smoothing operation.

Accordingly, smoothing calculation of the recorded state index values of the respective steps can be performed in test recording operation (OPC: a process for acquiring the optimum recording power), and the optimum power can be determined by finding out the optimum from the recording state index values of the respective steps after smoothing calculation. When the test recording area is read by deviations of the optical disk (media), the disparity of a motor shaft or a deviation of the disk checking portion, the optimum recording power can be accurately acquired even in case that the recorded state index value is not varied uniformly, and actual data recording is performed with the optimum recording power, whereby the recording quality is stabilized and a recording in which the read inability error is difficult to occur can be realized.

The optimum power determining unit is configured not to perform an actual recording operation on the optical disk when the absolute value of a difference between the recorded state index value calculated by the recorded state index value calculating unit and the recorded state index value smoothed by the smoothing calculating unit is greater than a predetermined threshold value. The threshold value is set to prevent actual recording when the swell generated by various deviations has a size in which a recorded state cannot be maintained even if recording is performed with the optimum recording power. Accordingly, when the absolute value of the difference between the recorded state index value at each step acquired by the recorded state index value calculating unit and the recorded state index value at each step smoothing-calculated by the smoothing calculating unit is greater than the predetermined threshold value, an optimum recording power is not determined and recording data on the media is not performed. Even if recording is performed with the optimum recording power in the swell generated by various deviations, an inconvenience such as the recorded state read inability error can be evaded and a problem that the optical disk becomes useless can be evaded.

The smoothing calculating unit performs an operation for calculating the average of the recorded state index value at each step and total three through five recorded state index values at one or two steps prior and posterior to said each step. Accordingly, the average of each recorded state index value and three, four, or five recorded state index values (the recorded state index values of three to five steps) at one or two steps prior and posterior thereto are acquired, and the recorded state index value of each step are smoothed, whereby the swell of the recorded state index value can be resolved.

Further, the number of recording blocks of the optical disk at each step is set on the basis of the number of blocks around one lap in an inner circumference of the optical disk and the number of the recorded state index values of which average is calculated in the smoothing operation. It is anticipated that the swell of reproduced information can be easily shown in synchronization with rotation of the optical disk. Accordingly, in setting the number of recording blocks of the optical disk at each step, the number of blocks (for example, a CD-R disk generally has about 9 blocks) around one lap in the inner circumference of the optical disk is divided by the number of the recorded state index values of which average is acquired by smoothing calculation, and when four or five recorded state index values are averaged by averaging calculation, recording is performed by two blocks in performing smoothing, 2×4 blocks or 2×5 blocks, that is, a section corresponding to one lap is averaged, whereby the swell component is removed by rotation of the reproduced information. In addition, in averaging calculation, when recording is performed by three blocks in performing smoothing by averaging three recorded state index values, 3×3 blocks, that is, a section corresponding to one lap of the disk is averaged, whereby the swell component is removed by rotation of the reproduced information.

Also, a temperature detector is provided for detecting an ambient temperature of the optical disk, and the test recording operation is performed again to re-determine the optimum power when the ambient temperature of the optical disk detected by the temperature detector at the time of actually performing the recording operation changes upon performing the test recording operation. Therefore, when a state of the optical disk is changed depending on the ambient temperature of the optical disk and the ambient temperature of the optical disk is changed by a change of the optimum power, test recording operation is re-performed. Accordingly, even if recording is performed with the optimum recording power, the inconvenience such as the recorded state read inability error can be evaded and the problem that the optical disk becomes useless can be evaded.

An optical disk recording method includes, prior to performing a recording operation on an optical disk for recording data thereon, a first step of recording information by irradiating a laser beam to an optical disk while varying recording power step by step; a second step of reproducing the information at the respective steps recorded on the optical disk in the first step; a third step of acquiring recorded state index values representing indexes of recorded states, from signal levels of the information at the respective steps reproduced in the second step; a fourth step of performing a smoothing operation to the recorded state index values acquired in the third step; and a fifth step of determining optimum recording power by finding out an optimum recorded state from the recorded state index value at each step acquired by the smoothing operation in the fourth step, wherein the recording is performed with the optimum recording power determined in the fifth step upon performing an actual recording operation.

Accordingly, in test recording operation (OPC: a process for acquiring the optimum recording power), smoothing calculation of the recorded state index value of each step is performed, and the optimum power is determined by finding out the optimum from the recording state index values of the respective steps after smoothing calculation. Even when the recorded state index value is not varied uniformly by deviations of the optical disk (media) 1, the disparity of a motor shaft or a deviation of the disk checking portion in reading the test recording area, the optimum recording power can be accurately acquired, and actual data recording is performed by using the optimum recording power. Therefore, the recording quality is stabilized and recording in which the read inability error is difficult to occur can be realized.

In the fifth step, the difference between recorded state index values of each steps before and after the fourth step of performing the smoothing operation is detected, and when the difference has an absolute value greater than a predetermined threshold value, the optimum recording power is not determined and the actual recording operation is not performed with respect to the optical disk. The threshold value is set to prevent actual recording when the swell generated by various deviations has the size in which the recorded state cannot be maintained even if recording is performed with the optimum recording power. Accordingly, when the absolute value of the difference between the recorded state index values at each step acquired by the recorded state index value calculating unit and the recorded state index value at each step smoothing-calculated by the smoothing calculating unit is greater than the predetermined threshold value, the optimum recording power is not determined and recording data on the media is not performed. Consequently, even if recording is performed with the optimum recording power in the swell generated by various deviations, the inconvenience such as the recorded state read inability error can be evaded and the problem that the optical disk becomes useless can be evaded.

In the smoothing operation in the fourth step, calculation is performed to acquire an average of the recorded state index value at each step and three through five recorded state index values at one or two steps prior and posterior to the each step. Accordingly, the average of each recorded state index value and three, four, or five recorded state index values (the recorded state index values of three to five steps) at one or two steps prior and posterior thereto is acquired and the recorded state index value of each step is smoothed, whereby the swell of the recorded state index value can be resolved.

In the first step, the number of recording blocks of the optical disk for recording thereon information at each step is set based on the number of blocks around one lap in an inner circumference of the optical disk and the number of the recorded state index values of which average is calculated by the smoothing operation. The swell of reproduced information can be easily shown in synchronization with rotation of the optical disk. Accordingly, the number of recording blocks of the optical disk at each step and the number of blocks (for example, the CD-R disk generally has about 9 blocks) around one lap in the inner circumference of the optical disk are divided by the number of the recorded state index values acquiring the average by smoothing calculation, and four or five recorded state index values are averaged by averaging calculation, and when recording is performed by two blocks in performing smoothing, 2×4 blocks or 2×5 blocks, that is, a section corresponding to one lap is averaged, whereby the swell component is removed by rotation of the reproduced information. In addition, in averaging calculation, when recording is performed by three blocks in performing smoothing by averaging three recorded state index values and, 3×3 blocks, that is, a section corresponding to one lap of the disk is averaged, whereby the swell component is removed by rotation of the reproduced information.

The test recording operation is re-performed to re-acquire the optimum recording power, when the ambient temperature of the optical disk at the time of performing the test recording operation in the first to the fifth steps changes upon performing the actual recording operation. Therefore, when the state of the optical disk is changed depending on the ambient temperature of the optical disk and the ambient temperature of the optical disk is changed by the change of the optimum power, test recording operation is re-performed. Accordingly, even if recording is performed with the optimum recording power, the inconvenience such as the recorded state read inability error can be evaded and the problem that the optical disk becomes useless can be evaded.

ADVANTAGE OF THE INVENTION

In the optical disk recording/reproducing apparatus and the optical disk recording method of the present invention, correct optimum recording power can be obtained and a stable recording quality can be obtained without specially adding a circuit or a complicated process, even if there occurs an eccentricity of media or deviations of media due to face blurring, or deviations of a motor shaft or a chuck member of the apparatus. Thereby, a reproduction inability error hardly occurs.

BEST MODE FOR CARRYING OUT THE INVENTION

Hereinafter, embodiments of the present invention will be described with reference to the drawings.

Embodiment 1

Figure 1:
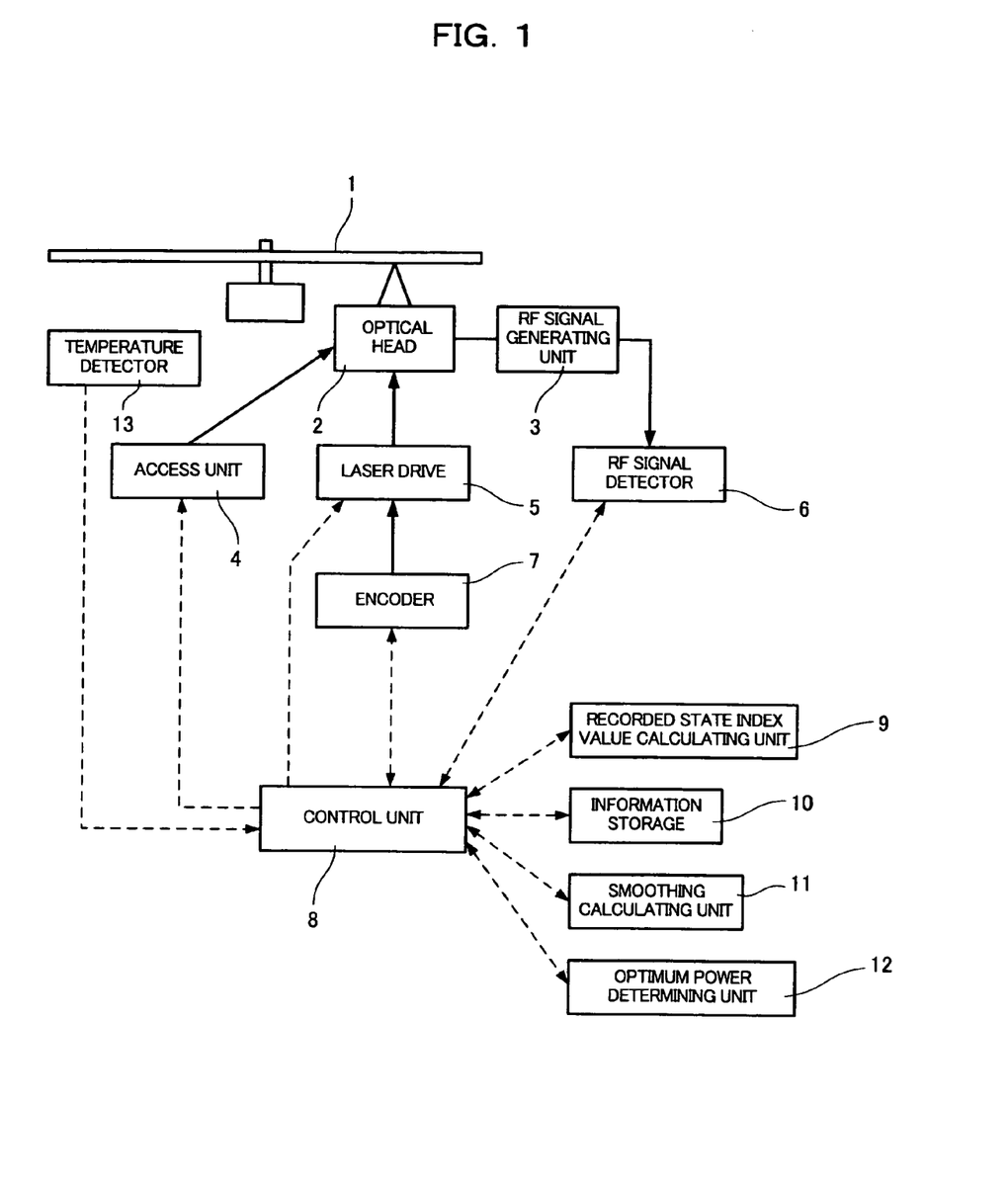
FIG. 1 is a block diagram of an optical disk recording/reproducing apparatus in Embodiment 1 of the present invention.

FIG. 1 is a block diagram of an optical disk recording/reproducing apparatus in Embodiment 1 of the present invention. An optical disk 1 recorded and produced by the optical disk recording/reproducing apparatus includes recordable media such as CD-R media or CD-RW media.

An optical disk recording/reproducing apparatus includes an optical head 2 which performs reading (reproducing) recorded data in the disk 1 by irradiating a laser beam tracing the optical disk 1 by driving a laser drive 5 described below at the time when the recorded data of the optical disk 1 are reproduced, performs recording the data with an optimum recording power acquired by an optimum power determining unit 12 described below by driving the laser drive when recorded, and performs recording the data and reading the recorded data by irradiating the laser beam to the optical disk 1 while varying a recording power stepwise at fifteen steps when further test-recorded, an RF signal generator 3 which generates a reproducing signal rather than a reading signal of the optical head 2, an access unit 4 which moves the optical head 2 toward a radial direction of the optical disk 1 by a control of a controller 8 described below, the laser drive 5 controlled with different laser powers in recording and reproducing by the control of the controller 8 described below, which outputs a reproducing laser beam in reproducing and outputs a recording laser beam with the optimum recording power acquired by the optimum power determining unit 12 described below in synchronization with an output of an encoder 7 described below in recording, and outputs the recording laser beam stepwise by varying the recording power at fifteen steps in further test recording, an RF signal detector 6 which detects an RF signal from the reproducing signal read via an RF signal generator 3, the encoder 7 which drives the laser drive 5 by modulating data to be recorded into recording pulse data (generating it as a recording pulse) for recording on the disk 1 by the control of the controller 8 described below, the controller 8 (to be in detail described below), a recorded state index value calculating unit 9 which acquires and records a recorded state index value which becomes an index of a recorded state from the RF signal detected by the RF signal detector 6 by calculation, by the control of the controller 8, an information storage 10 which stores the recorded state index value calculated by the recorded state index value calculating unit 9, by the control of the controller 8, a smoothing calculating unit 11 which performs smoothing calculation for acquiring the average of each recorded state index value and three, four, or five recorded state index values at one or two steps prior and posterior thereto on the basis of the recorded state index value stored in the information storage 10, by the control of the controller 8 to store the result in the information storage 10, the optimum power determining unit 12 which finds out an optimum value from the recorded state index value stored in the information storage 10 after smoothing calculation by the smoothing calculating unit 11 to determine the optimum power on the basis of a preset target value (to be described below) which becomes the index of the recorded state, by the control of the controller 8, and a temperature detector 13 which detects an ambient temperature of the optical disk 1 and outputs a temperature detection signal to the controller 8.

The controller 8, recorded state index value calculating unit 9, information storage 10, smoothing calculating unit 11 and optimum power determining unit 12 are configured by a computer. In addition, an information recording unit which records the information by irradiating the laser beam to the optical disk 1 while varying the recording power stepwise is configured by the optical head 2, laser drive 5 and encoder 7, and an information reproducing unit which reproduces the information stepwise recorded in the optical disk 1 by the information recording unit are configured by the optical head 2, RF signal generator 3 and RF signal detector 6.

Figure 2:
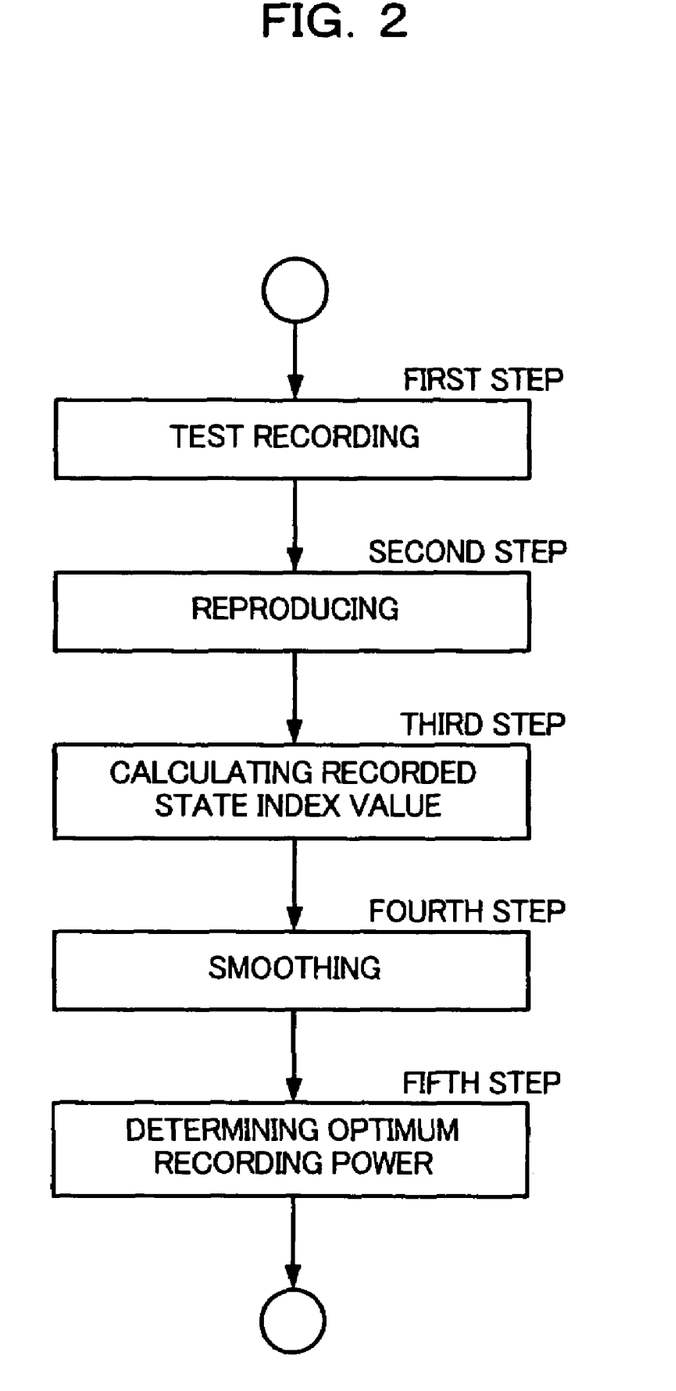
FIG. 2 is a flow chart showing an OPC operation of a control unit of an optical disk recording/reproducing apparatus.

In the optical disk recording/reproducing apparatus, an operation of the controller 8 which is a main part will be described when the optimum recording power is acquired by test recording prior to recording operation in accordance with a flow chart of FIG. 2.

First Step

First, the access unit 4 is driven and the optical head 2 is moved to a test recording area, the recording power is stepwise varied at fifteen steps by the laser drive 5, and a recording pulse is outputted by a command given to the encoder 7, so that test recording is performed.

Then, a swell of a sample value can be easily shown in synchronization with rotation of the disk, and setting is performed on the basis of the number of the recorded state index value for acquiring an average by smoothing-calculating the number of blocks around a first power step, in which test recording is performed and the number of blocks (for example, a CD-R disk generally has about 9 blocks) around one lap in an inner circumference of the optical disk 1. For example, 9 (the number of blocks around one lap in the inner circumference of the optical disk 1) is divided by 3 (the number of the recorded state index values acquiring the average by smoothing calculation) and the number '3' of blocks performing test recording around a first power step is acquired, test recording is performed with powers at fifteen steps by the acquired three blocks. (Moreover, it may be not fifteen steps.)

When fifteen steps of test recordings are performed in the inner circumference, the number of blocks around one lap generally is about nine in the inner circumference of the CD-R disk when recording is performed by three blocks, smoothing is performed by averaging three recorded state index values, since a sampling section of a value of a 3×3 block section, that is, a value corresponding to one lap of the disk is averaged, it is effective to remove a swell component by rotation of the sampling value.

In test recording, recording around a first step is performed by three blocks, so that when compared with recording by one block, a test recording area is consumed, but in rewritable media such as CD-RW, since the test recording area can be erased and reused, there is no particular problem. In case of CD-R, it is not necessary to increase the number of consumed frames too much. In addition, the number of blocks around the first step is three, but the number can be varied depending on a smoothing method, a test recording location and the like, whereby the number needs not to be three. For example, when 9 (the number of blocks around one lap in the inner circumference of the optical disk 1) is divided by 4 or 5 (the number of the recorded state index values acquiring the average by smoothing calculation), the number '2' of blocks performing test recording around the first power step is acquired, the recording power is converted in the inner circumference by two blocks, smoothing is performed by acquiring the average of four or five recorded state index values test recording is performed, the averaging sampling section is 2×4=8 blocks and 2×5=10 blocks, and a value close to the value of one lap of the disk, whereby it is effective to remove the swell component by rotation of the sampling value similarly.

Second Step

Next, the optical head 2 is moved to the test recording area by driving the access unit 4, the area is reproduced by the optical head 2, and values of a peak level, a center level and a bottom level of the RF signal which can be acquired from the RF signal detector 6 while synchronized with a location varying the power in test recording are sampled, whereby average level values in the respective sections can be acquired.

Third Step

Next, the recorded state index value is calculated on the basis of the average value of the peak level, center level and bottom level in the respective sections by using the recorded state index value calculating unit 9, and the results at fifteen steps are stored in a memory array DATA[1 to 15] by using the information storage 10. When an amplitude toward a peak value side is set to A1 and the amplitude of a bottom value side is set to A2, centering on the center level of RF, the recorded state index value is acquired as β (asymmetry) by, for example, Formula (1). β represents an asymmetric characteristic of an RF waveform, thereby being used as one of the recorded state indexes.

$$\beta = 100 \times (A1 - A2)/(A1 + A2) \tag{1}$$

Fourth Step

Next, smoothing calculation is performed by the smoothing calculating unit 11 on the basis of the memory array DATA[1 to 15] stored in the information storage 10 and the result is stored in a memory array DATA2[1 to 15] of the information storage 10. Collinear approximation or curve approximation, for example, may be performed as smoothing calculation, but a method of averaging three values (three items) such as a recorded state index value of each step, a recorded state index value of one step before each step and a recorded state index value of one step after each step are used.

Figure 3:
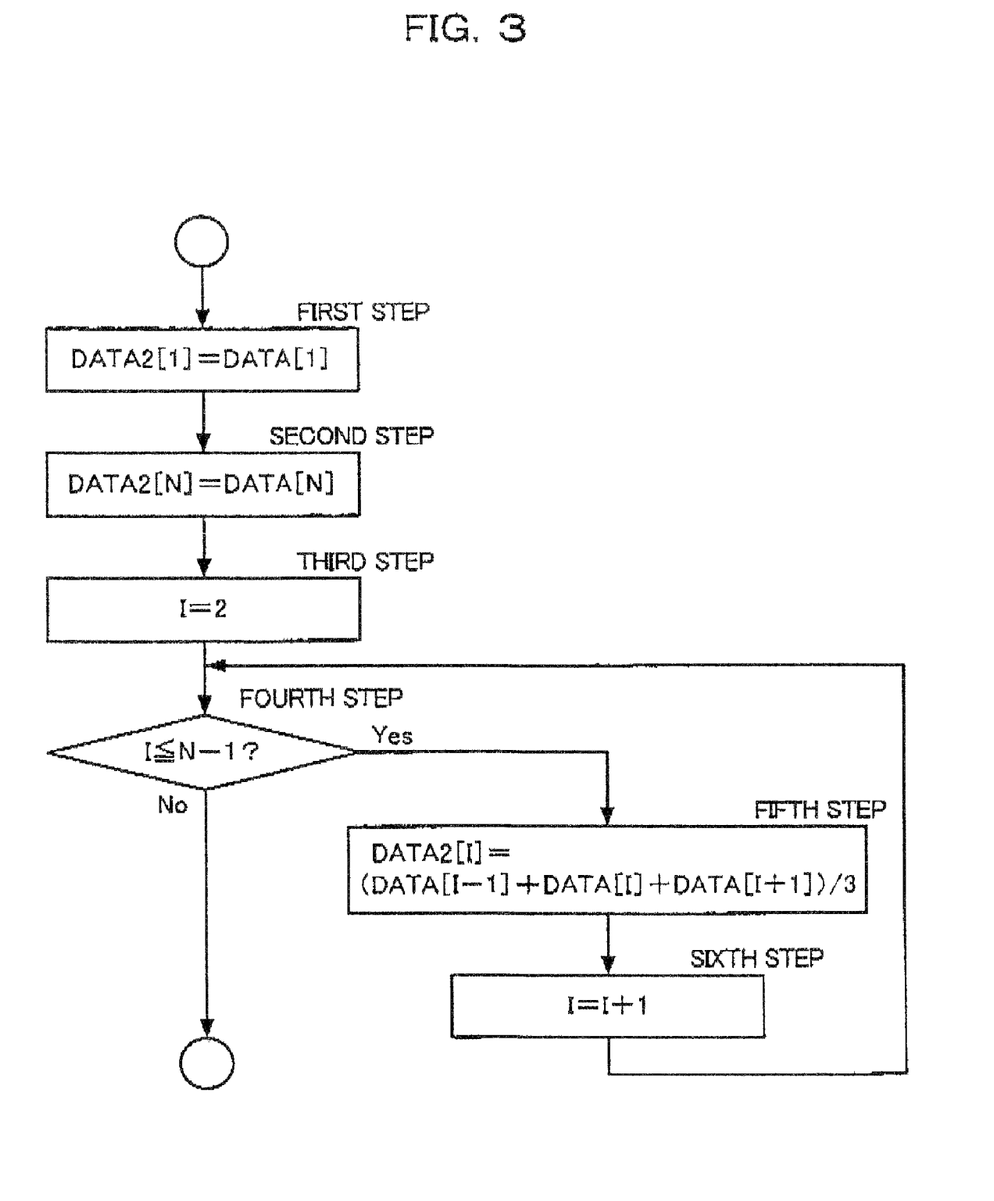
FIG. 3 is a flow chart of smoothing calculation in the control unit of an optical disk recording/reproducing apparatus.
Figure 4A:
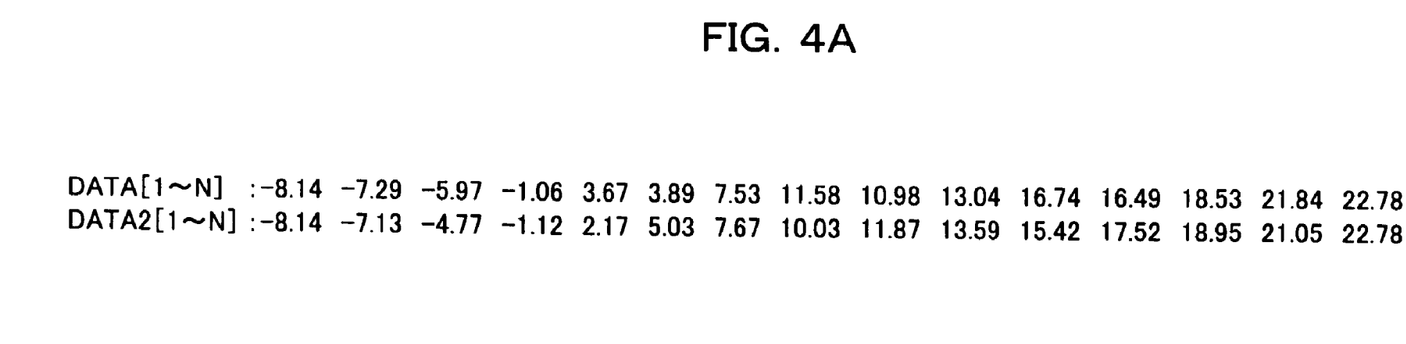
FIG. 4A is data of $\beta$ and smoothing-calculated value acquired by an optical disk recording/reproducing apparatus.
Figure 4B:
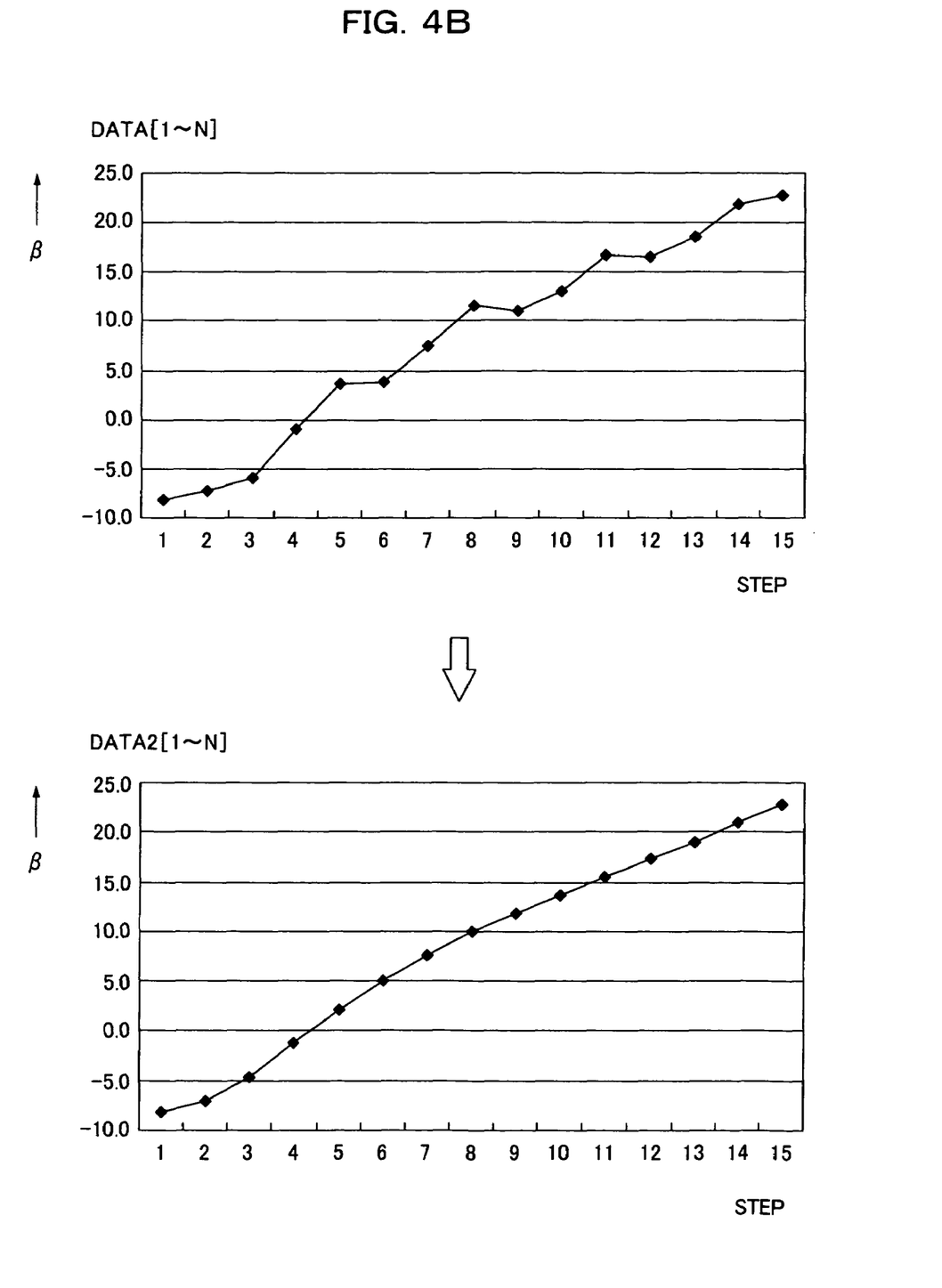
FIG. 4B is a characteristics graph of $\beta$ and smoothing-calculated value acquired by an optical disk recording/reproducing apparatus.
Figure 4C:
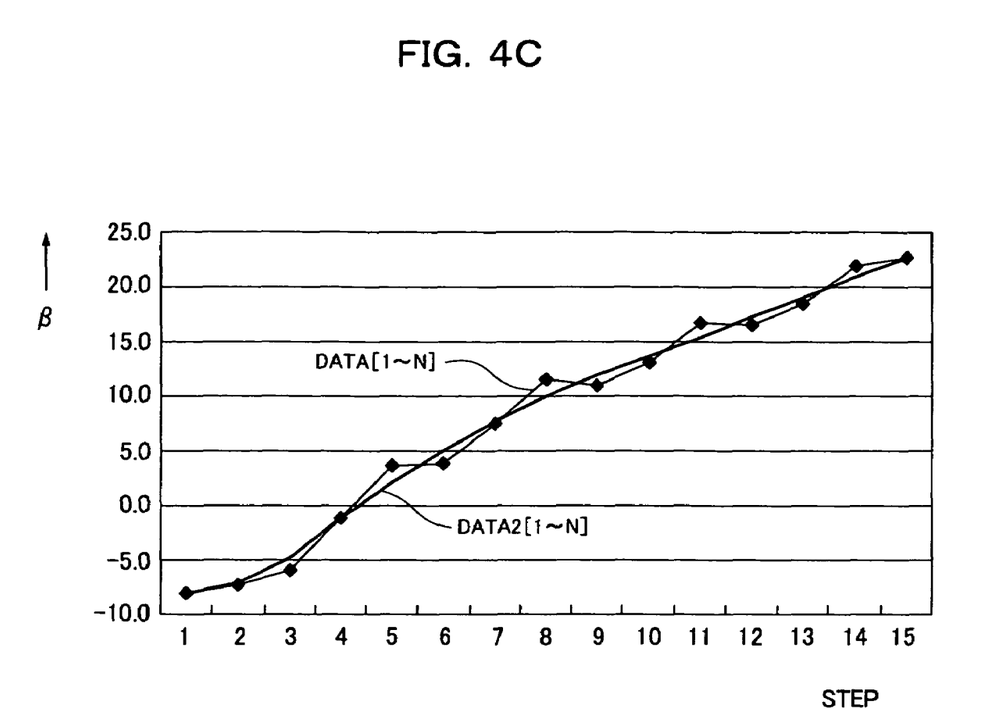
FIG. 4C is a characteristics graph overlapping $\beta$ and smoothing-calculated value acquired by an optical disk recording/reproducing apparatus.

In FIG. 3, as shown in the fourth to sixth steps, the value (smoothing calculating value) averaging the three items with respect to DATA2 [2 to 14] is stored, as shown in the first step, DATA [1] is just copied with respect to DATA [2], and as shown in the second step, DATA [15] is just copied with respect to DATA2 [15]. FIG. 4A shows examples of DATA [1 to 15] and DATA2 [1 to 15]. FIG. 4B is a characteristics graph of DATA [1 to 15] and DATA2 [1 to 15]. As shown in FIG. 4A, the properties of DATA [1 to 15] and DATA2 [1 to 15] are overlapped, whereby the swell of .beta. is resolved by DATA2 [1 to 15].

Moreover, in this embodiment, smoothing is performed by averaging the three items as described above, but smoothing may be performed by averaging four items or five items, or by approximation such as collinear approximation or curve approximation.

Fifth Step

Next, a value closest to a value target βt which becomes an index of a preset recorded state is found out (The optimum value is found out.) out of the memory array DATA2[1 to 15] stored in the information storage 10 by the optimum power determining unit 12, two values β and β2 which become the index of the recorded state are found, and the recording powers P1 and P2 corresponding to β1, β2 and βt, and β1 and β2, and the recoding power corresponding to βt are acquired as the optimum recording power by linear calculation.

The optimum recording power is set as the recording power in the laser drive 5 and actual data recording operation is performed.

The control unit 8 confirms the ambient temperature of the optical disk 1 by a detection signal of the temperature detector 13, whereby the control unit 8 implements the test recording again when confirming that the ambient temperature of the optical disk 1 in test recording is changed into a predetermined temperature at the time when actual data recording is performed.

As described above, in accordance with Embodiment 1, in test recording operation (OPC: a process for acquiring the optimum recording power), smoothing calculation of the recorded state index values of the respective steps is performed, particularly, without adding a circuit or a complicated process, and the optimum power is determined by finding out the optimum from the recording state index values of the respective steps after smoothing calculation. Even when the recorded state index value is not varied uniformly by deviations of the optical disk (media) 1, the disparity of a motor shaft or a deviation of the disk checking portion in reading the test recording area, the optimum recording power can be accurately acquired, and actual data recording is performed with the optimum recording power, whereby the recording quality is stabilized and recording in which the read inability error is difficult to occur can be realized.

In addition, in Embodiment 1, an average of each recorded state index value and three, four, or five recorded state index values (the recorded state index values of three to five steps) at one or two steps prior and posterior thereto is acquired and the recorded state index value of each step is smoothed, whereby the swell of the recorded state index value can be resolved and a correct optimum recording power can be accurately acquired.

In Embodiment, the number of recording blocks of the optical disk of each step and the number of blocks around one lap in the inner circumference of the optical disk 1 are divided by the recorded state index value of which the average is calculated by the smoothing operation. Accordingly, a section corresponding to one lap of the disk 1 is averaged by smoothing calculation, whereby the swell component can be removed by rotation of the reproduced information.

In Embodiment 1, when a state of the optical disk 1 is changed depending on the ambient temperature of the optical disk and the ambient temperature of the optical disk 1 is changed by a change of the optimum power, test recording operation is re-performed. Accordingly, even if recording is performed with the optimum recording power, an inconvenience such as a recorded state read inability error can be evaded and a problem that the optical disk 1 becomes useless can be evaded.

Embodiment 2

Figure 5:
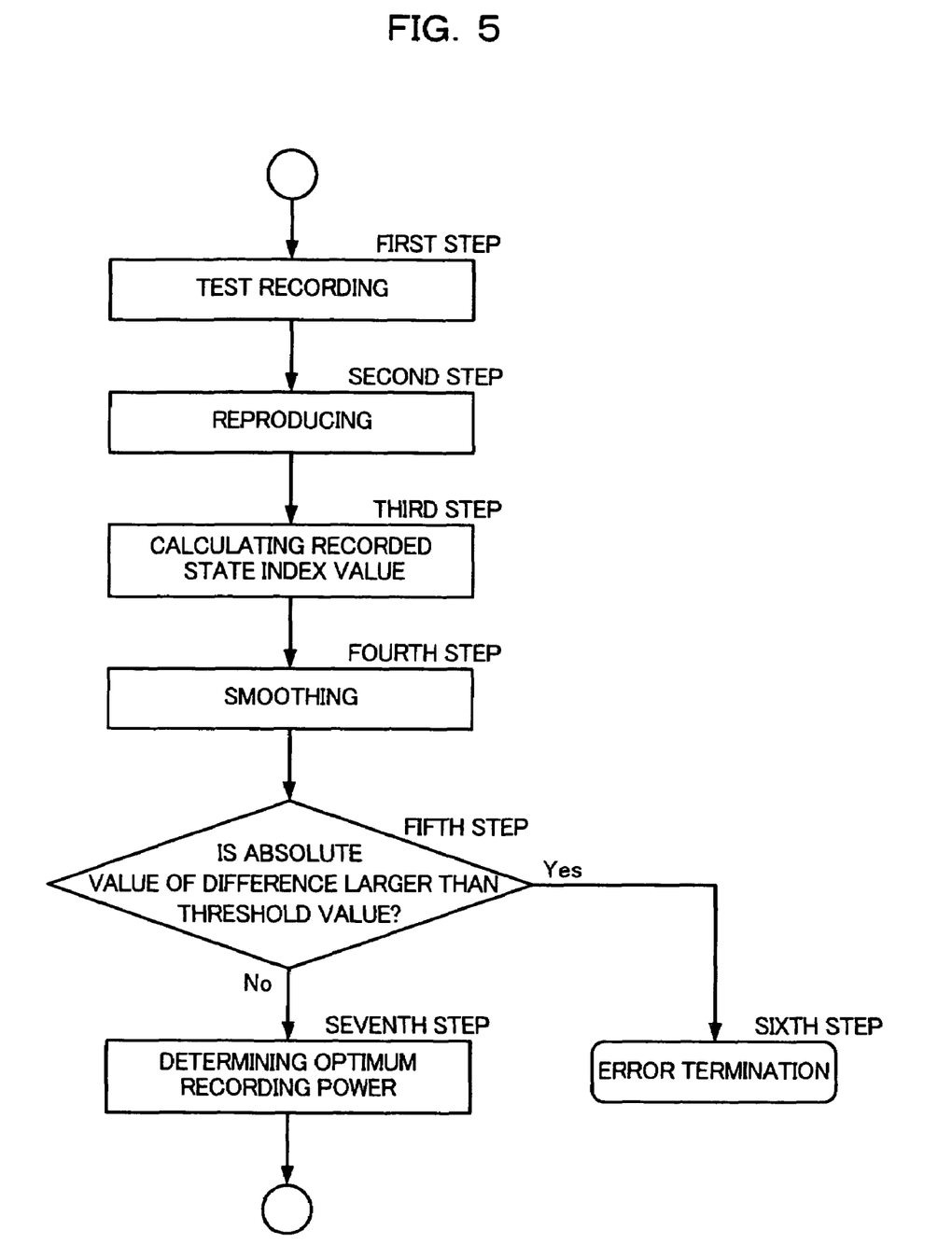
FIG. 5 is a flow chart showing an OPC operation of an optical disk recording/reproducing apparatus in Embodiment 2 of the present invention.

FIG. 5 is a flow chart showing an operation of the control unit 8 of the optical disk recording/reproducing apparatus in Embodiment 2 of the present invention. A configuration of the optical disk recording/reproducing apparatus is similar as that in Embodiment 1.

The operation of the control unit 8 in Embodiment 2 is described before recording operation is performed and when the optimum recording power is acquired by test writing. Moreover, the first to fourth steps are similar to the operation of the control unit 8 in Embodiment 1, is greater than the description thereof is skipped.

Fifth Step

When smoothing calculation of the fourth step is terminated, a value DATA[1 to 15] before smoothing and a value DATA2[1 to 15] after smoothing, which are stored in the information storage 10 are compared, is greater than the absolute value of a difference thereof is greater than a predetermined threshold value is judged.

Sixth Step

When the absolute value of the difference is greater than the predetermined threshold value is judged, it is judged to be an error, whereby recording data in the media is not performed.

The threshold value is set to prevent actual recording when the swell generated by various deviations has a size in which a recorded state cannot be maintained even if recording is performed with the optimum recording power.

In this case, an user cannot performs actual data recording, but the user can record data in other apparatuses since the media can be used. When the swell is generated by the deviation in checking, the media is inserted into the apparatus again and the checking is re-performed, the recording can be performed in an optimum recording state. Recording can be performed in the optimum recording state by the recording at a different speed.

Seventh Step

Next, a value closest to a target value βt which becomes an index of a preset recorded state is found out (The optimum value is found out.) out of the memory array DATA2[1 to 15] stored in the information storage 10 by the optimum power determining unit 12, two values β1 and β2 which become the index of the recorded state are found, and the recording powers P1 and P2 corresponding to β1, β2 and βt, and β1 and β2, and the recoding power corresponding to βt are acquired as the optimum recording power by linear calculation.

The optimum recording power is set as the recording power in the laser drive 5 and actual data recording operation is performed.

The control unit 8 confirms the ambient temperature of the optical disk 1 by the detection signal of the temperature detector 13, whereby the control unit 8 implements the test recording again when confirming that the ambient temperature of the optical disk 1 in test recording is changed into the predetermined temperature at the time when actual data recording is performed.

As shown above, in Embodiment 2, since a correct optimum recording power is acquired by performing data recording with a acquired optimum recording power even if the eccentricity and the like occurs, a more stable recording can be performed, whereby recording in which a read error in reproduction is difficult to occur can be performed.

Consequently, even if recording is performed with the optimum recording power in the swell generated by various deviations, the inconvenience such as the recorded state read inability error can be evaded and the problem that the optical disk becomes useless can be evaded.

INDUSTRIAL APPLICABILITY

In the optical disk recording/reproducing apparatus and the optical disk recording method, an optimum recording power of an optical laser beam can be obtained without depending on the deviations of the media, the deviations of the apparatus and the like, and recording in which the reproduction inability error is difficult to occur can be realized. In addition, the optical disk recording/reproducing apparatus and the optical disk recording method are useful as a technology for recording data of various media.

The invention claimed is:

1. An optical disk recording/reproducing apparatus for recording and reproducing information by irradiating a laser beam to an optical disk on which data are recorded, and performing a test recording operation on the optical disk to determine optimum recording power of the laser beam prior to recording information, the optical disk recording/reproducing apparatus comprising:

an information recording unit for recording information by irradiating the laser beam to the optical disk while varying the recording power stepwise at a plurality of steps;

an information reproducing unit for reproducing the information stepwise recorded in the optical disk by the information recording unit;

a recorded state index value calculating unit for calculating stepwise recorded state index values which represent an index of a recorded state from signal levels of the information stepwise reproduced by the information reproducing unit;

a smoothing calculating unit for performing a smoothing operation to the recorded state index values calculated stepwise by the recorded state index value calculating unit; and an optimum power determining unit for determining the optimum recording power by finding out an optimum recorded state from the recorded state index values stepwise calculated by the smoothing operation performed by the smoothing calculating unit, wherein the smoothing calculating unit performs an operation, as the smoothing operation, for calculating an average of the recorded state index value at each step and a total of three through five recorded state index values at one or two steps prior and posterior to said each step.

2. The optical disk recording/reproducing apparatus according to claim 1, wherein the optimum power determining unit is configured to not perform an actual recording operation on the optical disk without determining the optimum recording power, when a difference between each of the recorded state index values stepwise on which the smoothing operation has been performed by the smoothing calculating unit is found out and the absolute value of the difference greater than a predetermined threshold value.

3. The optical disk recording/reproducing apparatus according to claim 1, wherein the number of recording blocks of the optical disk on which the information is recorded stepwise at each step is set based on the number of blocks around one lap in an inner circumference of the optical disk and the number of the recorded state index values of which average is calculated in the smoothing operation.

4. The optical disk recording/reproducing apparatus according to claim 1, further comprising a temperature detector for detecting an ambient temperature of the optical disk, wherein the test recording operation is performed again to re-determine the optimum power when the ambient temperature of the optical disk detected by the temperature detector at the time of actually performing the recording operation changes upon performing the test recording operation.

5. An optical disk recording method comprising, prior to performing a recording operation on an optical disk for recoding data thereon:

a first step of recording information by irradiating a laser beam to an optical disk while varying recording power step by step;

a second step of reproducing the information at the respective steps recorded on the optical disk in the first step;

a third step of acquiring recorded state index values representing indexes of recorded states, from signal levels of the information at the respective steps reproduced in the second step;

a fourth step of performing a smoothing operation on the recorded state index values acquired in the third step; and a fifth step of determining optimum recording power by finding out an optimum recorded state from the recorded state index value at each step acquired by the smoothing operation in the fourth step, wherein the recording is performed with the optimum recording power determined in the fifth step upon performing an actual recording operation, and as the smoothing operation in the fourth step, a calculation for acquiring an average of the recorded state index value at each step and three through five recorded state index values at one or two steps prior and posterior to said each step is performed.

6. The optical disk recording method according to claim 5, wherein in the fifth step, the difference between recorded state index values of each step before and after the fourth step of performing the smoothing operation is detected, and when the difference has an absolute value greater than a predetermined threshold value, the optimum recording power is not determined and the actual recording operation is not performed with respect to the optical disk.

7. The optical disk recording method according to claim 5, wherein in the first step, the number of recording blocks of the optical disk for recording thereon information at each step is set based on the number of blocks around one lap in an inner circumference of the optical disk and the number of the recorded state index values of which average is calculated by the smoothing operation.

8. The optical disk recording method according to claim 5, wherein the operation in the first to fifth steps is re-performed to re-acquire the optimum recording power, when the ambient temperature of the optical disk at the time of performing the operation in the first to the fifth steps changes upon performing the actual recording operation.

* * * * *